(12) United States Patent
Labrador et al.

(10) Patent No.: US 8,385,888 B2
(45) Date of Patent: Feb. 26, 2013

(54) AUTHENTICATION OF MOBILE DEVICES OVER VOICE CHANNELS

(75) Inventors: Christopher Labrador, Waterloo (CA); Alexander Reif, Bonn (DE); Michael Eric Gray, Montclair, NJ (US); Douglas Gisby, Rolling Meadows, IL (US); Colin Mark Werner, Kitchener (CA)

(73) Assignee: Research In Motion Limited, Waterloo (CA)

( * ) Notice: Subject to any disclaimer, the term of this patent is extended or adjusted under 35 U.S.C. 154(b) by 375 days.

(21) Appl. No.: 12/637,046

(22) Filed: Dec. 14, 2009

(65) Prior Publication Data

US 2011/0143715 A1 Jun. 16, 2011

(51) Int. Cl.
*H04M 1/68* (2006.01)

(52) U.S. Cl. .................. 455/411; 379/88.2; 379/142.05; 379/142.18; 379/283

(58) Field of Classification Search .................. 455/411; 379/88.2, 142.05, 142.18, 283
See application file for complete search history.

(56) References Cited

U.S. PATENT DOCUMENTS

| | | | |
|---|---|---|---|
| 5,481,611 A | 1/1996 | Owens et al. | |
| 7,440,558 B2 | 10/2008 | Heilmann et al. | |
| 8,090,650 B2 * | 1/2012 | Jackson et al. | 705/39 |
| 2007/0190975 A1 | 8/2007 | Eonnet | |
| 2008/0119165 A1 | 5/2008 | Mittal et al. | |
| 2010/0215159 A1* | 8/2010 | Milton | 379/93.02 |

FOREIGN PATENT DOCUMENTS

GB 2397731 A 7/2004

OTHER PUBLICATIONS

European Search report mailed on Jul. 19, 2010. In corresponding application No. 09179101.2.
Cisco Secure Access Control Server ;http://www.cisco.com/en/US/solutions/collateral/ns339/ns639/ns641/net_implementation_white_paper0900aecd80460724.html. Retrieved on May 7, 2012.
Notice of Allowance and Fee(s) due mailed Jul. 23, 2012, in corresponding Canadian patent application No. 2,720,426.

* cited by examiner

*Primary Examiner* — Amancio Gonzalez
(74) *Attorney, Agent, or Firm* — Novak Druce + Quigg LLP (57) ABSTRACT

Mobile devices are authorized to access PBX-based voice services through presentation of audible tones on a voice channel, which are determined based on a code received over a separate data channel. The device can request a code over a data channel from a server in communication with the PBX. The server provides data representative of the code over the data channel to the device, and arranges for local storage of the code. The device makes a connection with the PBX over a separate voice channel. The mobile device presents the received code as a sequence of audio tones (e.g., DTMF tones). The audio tones are used to generate data that can be compared with stored codes by an authentication module. The authorization module can indicate to the PBX that the code is valid; services can be provided by the PBX in response. The valid codes can be maintained, such as by removing used codes from code storage.

30 Claims, 6 Drawing Sheets

AUTHENTICATION OF MOBILE DEVICES OVER VOICE CHANNELS

BACKGROUND

1. Field

The following relates to data and voice-enabled devices, such as data-enabled mobile phones, digital assistants, and smartphones, and more particularly to authentication of such devices for access to voice services.

2. Related Art

Although much emphasis has been placed, of late, on providing data communication capabilities on mobile phones, voice services and voice communications remain an important feature to be made available on mobile devices. In corporate networks, voice services can include voice conferencing services, for example. Mobile devices may be used for "dialing in" to such voice conferences. However, authenticating a mobile device over a voice channel is different from authenticating that device over a secure data channel. For example, caller ID information may be available for the mobile device, but such information can be spoofed and sometimes is not available. In the case, of conference calls, a number can be distributed with a meeting invitation to allow users to dial in. However, voice channels are prone to eavesdropping, and if the number were intercepted or captured, then it could be used for dialing into the conference. Also, other voice services may be available through a Private Branch eXchange (PBX), to which mobile devices should be given conditional access. Therefore, advances in authentication of mobile devices over voice channels continue to be desirable.

DESCRIPTION

The following description provides examples and other disclosure, which teach those of ordinary skill in the art how to practice implementations and embodiments of inventive aspects described herein. As such, the description is not limiting, but rather is exemplary.

For convenience, in this description, the term "mobile device" is generally used to refer to any portable or mobile network-enabled device that has capabilities to send and receive voice calls and to send and receive data, such as data generated by web browsing, e-mail, SMS, instant messaging, and the like. As will become clear, a variety of devices in a variety of form factors can meet such a definition, including, for example, smartphones, laptops configured with appropriate network connections and user input devices, tablet computers, and netbooks.

In some cases, services available over a voice network are sensitive, and should be secured to reduce or prevent unauthorized access. Such services can be sensitive, because they can be expensive to provide. Some services, if compromised, can cause privacy breaches, and losses of confidential or proprietary information. In other cases, it would be desirable to have better confidence in the identity of who or what devices are using particular resources, or even to track usage of such resources by certain devices.

By contrasting example, in a corporate setting, a teleconference bridge can be arranged for a teleconference that is intended to involve a group of participants; a bridge code can be disseminated for access to the teleconference, as well as other information such as a number to dial. However, depending on how the code is disseminated, such as via a calendaring program that sends meeting invites, that code can be easily distributed beyond its intended audience. Further, when attendees join the conference, an undifferentiated code does not provide a means to audit who attended and who did not. Using caller identification information is less than perfect for these purposes, because it can be spoofed and is not necessarily available. Also, when a user joins a conference with such an undifferentiated code, an eavesdropper can learn the code and either join that conference, or in some cases, save that code for future use.

Further, other services that can be made available through a Private Branch eXchange (PBX) include allowing dial-out from the bridge by mobile devices. For example, if a user desires to avoid disclosing his mobile number to a called party, and instead appear to be calling from a corporate PBX, then the user can call into the PBX, have the PBX dial a particular number and join the user call to the PBX with the PBX call to the called party. Since such approaches can incur toll charges, and for other reasons, access to such services by unauthorized devices or persons ideally should be prevented.

The following aspects relate to systems and devices that provide voice communication, for which data can be carried over switched circuit voice channels, and data communication that can be carried by data channels, such as packet networks that use Internet Protocol (IP) addressing and transport layers such as Transport Control Protocol (TCP) and/or User Datagram Protocol (UDP). These aspects relate to a mobile device requesting an authentication token over a data channel to be used for authenticating over the voice channel. The authentication token is presented on the voice channel as a series of audible tones that can be carried on the voice channel. Preferably, the token is associated with permissions, by an issuer, that allow the token to be used only once to authenticate. A database of issued and valid tokens can be maintained by a token issuer for use in comparisons to verify authenticity of devices presenting information as valid tokens.

In one example, to authenticate, the mobile device can use the token as a specification of a series of audible tones, which is modulated on a voice call to authenticate with the far end of the call. The far end can convert the tones back to data that can be compared with the database of issued and valid tokens. The database can be maintained responsive to such an authentication.

Figure 1:
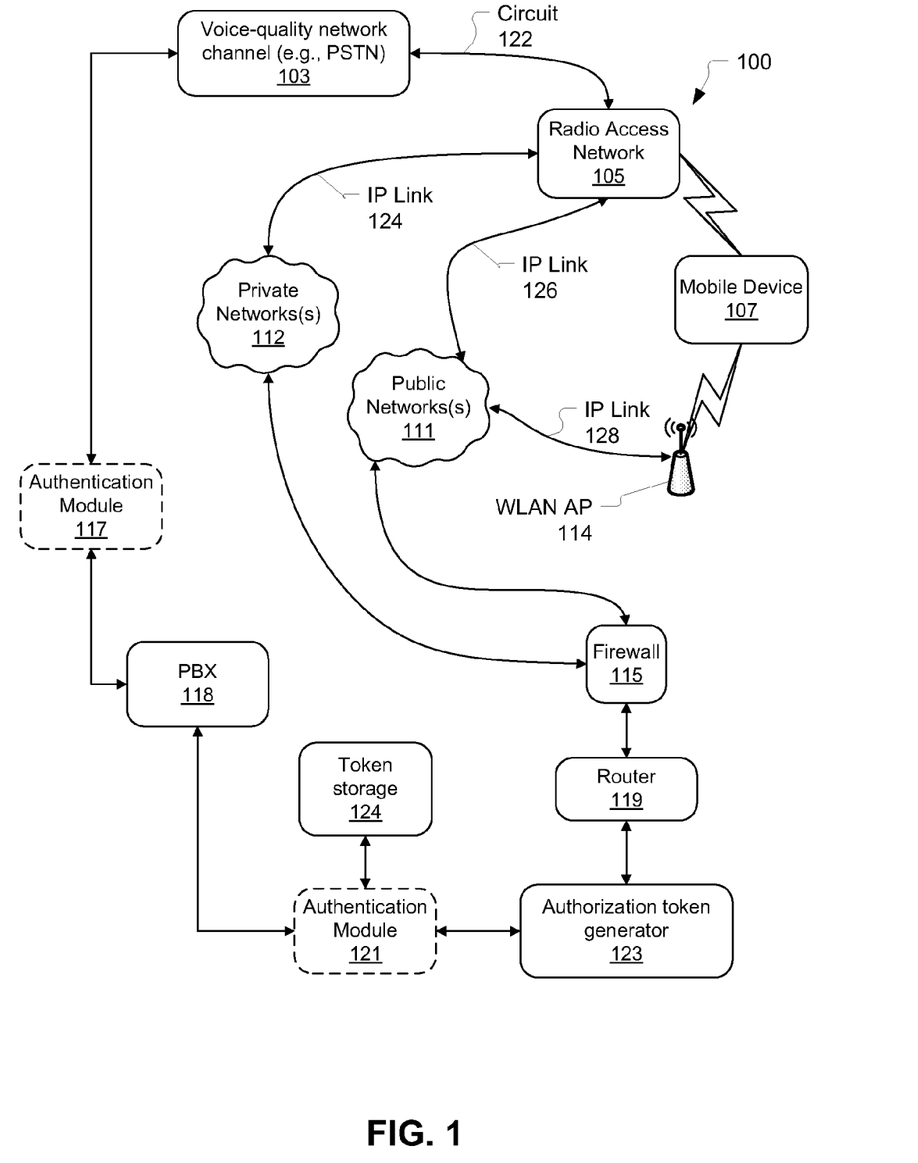
FIG. 1 depicts an example system view where a mobile device authorizes for using PBX services using a code obtained over a data channel and presented over a voice channel.

In a more-specific example, FIG. 1 depicts a system architecture 100 in which a data and voice-enabled mobile device 107 can operate. A Radio Access Network (RAN) 105 provides broadband wireless access to device 107. Radio access network (RAN) 105 communicates wirelessly with device 107, and connects device 107 via a circuit 122 with a voice-quality network channel 103. Voice-quality network 103 can serve as a bearer channel for voice calls in which mobile device 107 participates, and can comprise portions of the Public Switched Telephone Network (PSTN).

RAN 105 also can connect through an IP link 124 to private network(s) 112 and through an IP link 126 with public network(s) 111. Usage of IP is exemplary and other addressing systems can be provided. For example, private networks 112 can use X.25 addressing and also can be implemented using Virtual Private Network (VPN) technology to carry data over public networks 111.

Mobile device 107 also can have an interface for communication using local area wireless network technologies, such as 802.11 series technologies. When using such technologies for communication, mobile device 107 typically interfaces with a wireless LAN access point 114, which can communicate over public network(s) 111, such as through a router (not depicted). Communications on this medium also can be addressed using IP, as depicted by labeling the link IP link 128.

Preferably, these data interfaces are used to carry encrypted communications. For example, authentication token generator 123 can encrypt token information using a public key associated with mobile device 107. In other cases, a link between authentication token generator 123 and mobile device 107 (or another suitable device in a network trusted by authorization token generator 123) can be ciphered using bulk encryption with a shared secret key. However, voice communications (e.g., carried on circuit 122 and voice-quality network channel 103) typically are not encrypted and a token provided from authorization server 123 to mobile device 107 on that medium could be more easily intercepted.

Each voice call in which mobile device 107 is terminated at a far end, and in the present example of FIG. 1, calls that are directed to a PBX 118 can be terminated by PBX 118, or optionally by an authentication module 117. If calls are terminated by PBX 118, then an authentication module 121 can be provided for communication with PBX 118 (although separately identified, such an authentication module can also be integrated into PBX 118). Either authentication module 117 or 121 can communicate with an authorization token content generator 123. Token content generator 123 can communicate with a router 119, which in turn can communicate with a firewall 115. Although separately identified for discussion purposes authorization token content generator 123 can be integrated with PBX 118, or with authorization module 121. Firewall 115 can direct communicate to and receive communication from public network(s) 111 and private network(s) 112.

Figure 2:
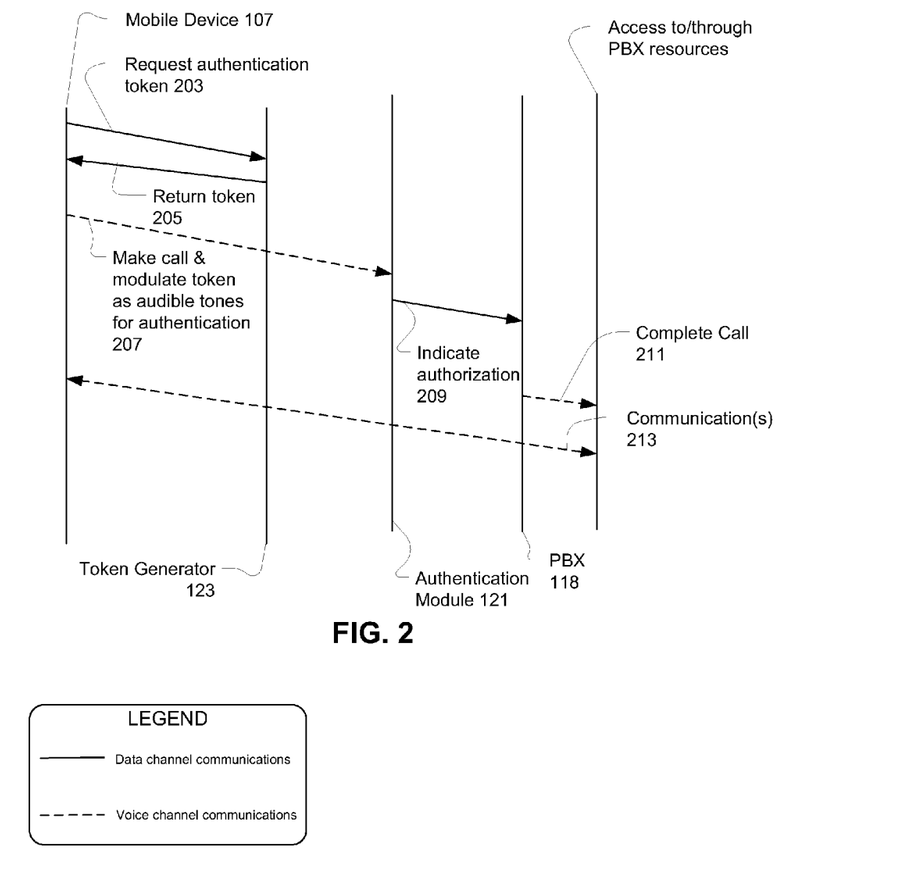
FIG. 2 depicts a signal ladder depicting an example of communication between components depicted in FIG. 1.

Examples of communications that may be carried over the depicted voice and data communication channels are further described with respect to FIG. 2.

FIG. 2 depicts a signal ladder of communications that can take place in exemplary methods and systems. In FIG. 2, mobile device 107 can request an authentication token from token generator 123 over a data connection, which can comprise one or more of IP links 124, 126, and 128. The request from mobile device 107 traverses firewall 115 and router 119 and is received by authorization token generator 123. Token generator 123 determines an authentication token to be provided to device 107, and returns (205) data descriptive of that token through router 119, firewall 115, for traversal over one or more of the IP links 124, 126, and 128. Token generator 123 also can store data representative of the generated token in token storage 124 (token data storage also can be implemented coincidentally with token generation).

The authentication token comprises data describing a plurality of audible tones that can pass on a typical voice channel, and in some examples, the token can comprise data descriptive of a plurality of DTMF tones, and in some of these examples, the data can comprise a series of digits that are mappable to DTMF tones. In some of these examples, such a mapping can be a standard mapping of DTMF tones to numbers on a keypad. Usage by device 107 of the token data in various of these examples is described in more detail below.

Upon reception of the token at device 107, device 107 can make (207) a call that traverses voice network 103 (circuit 122). The call can be terminated at PBX 118, or, if provided, authentication module 117. Upon establishing the call, device 107 can modulate (also 207) the audible tones described by the token data onto the voice channel for receipt by the terminating point (identified herein as PBX 118, for convenience and not by way of limitation).

PBX 118 receives the tones and maps them to an alphanumeric string (e.g., a series of numbers, a series of letters, and a combination of numbers and letters). The alphanumeric string can be represented by binary information. That string can then be compared with tokens stored in token storage 124. Examples of how token storage 124 can be searched or tokens from token storage 124 can be otherwise matched with the string determined from the received tones are explained below.

Upon determining that the string represents a valid token, authentication module 121 (117) can send (209) an authorization indication to PBX 118, which can then allow device 107 to access services, or provide services to mobile device 107. Such services can include completing a call (211) on behalf of mobile device 107, and joining mobile device 107 to a conference call. Thereafter, mobile device 107 can communicate (213) or otherwise use the available and authorized voice services.

Figure 3:
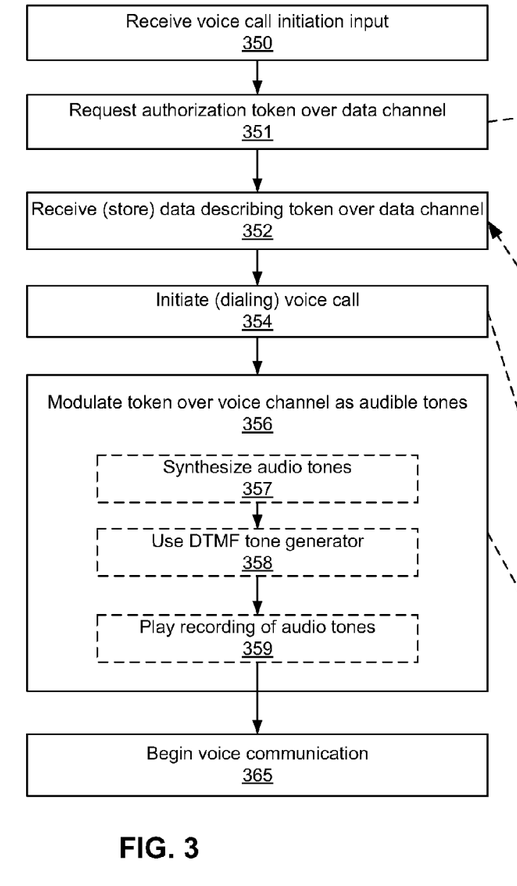
FIG. 3 depicts steps of a method that can be implemented on a mobile device.

Now turning to FIG. 3, a depicted example method that can be implemented on mobile device 107 for effecting the signaling approach of FIG. 2 is explained. A voice call initiation input or request can be received (350) at a user interface on the device (e.g., a calendaring program can initiate a call to join mobile device 107 to a teleconference, or a user can indicate a desire to make a call through the PBX). Mobile device 107 requests (351) an authorization token from a data channel (e.g., an IP-based data interface, such as described with respect to FIG. 1). Some time removed, mobile device 107 receives (352) data describing an authorization token over the data channel. Mobile device 107 initiates (354), such as by dialing using a phone number, a voice call to a device or system that has access to information that can be used to verify the received token and which is configured for receiving voice calls (e.g., PBX 118, or authentication module 117). Upon establishing the voice call, mobile device 107 modulates (356) the received token over the voice channel. Such modulation can be effected by a variety of approaches. In another example, the modulation (356) can be conducted using a separate device, such as a landline phone. In such an example, a user can obtain a code from (through) the mobile device and input that code into a keypad of a landline phone after dialing an appropriate access number. The code can be used for authorization and can otherwise be handled in the same way as if the code had been used for automatic authentication by the device.

One approach is to synthesize (357) audio tones that are described by data received which describes the token. Another example is to use (358) a Dual Tone MultiFrequency (DTMF) synthesizer provided with a mobile device for dialing numbers over the PSTN. In such an example, the token can be described by a series of numbers or letters mapped to DTMF tones in the familiar dialpad format. In other examples, the authentication token can be received as a recording of audio tones, and in such examples, the recording can be played (359) over the voice channel (see, e.g., voice channel 103 of FIG. 1). These examples are described in more detail below. Subsequently, mobile device (107) can begin communication (365) or otherwise have access to services and resources available over the voice channel.

Figure 4:
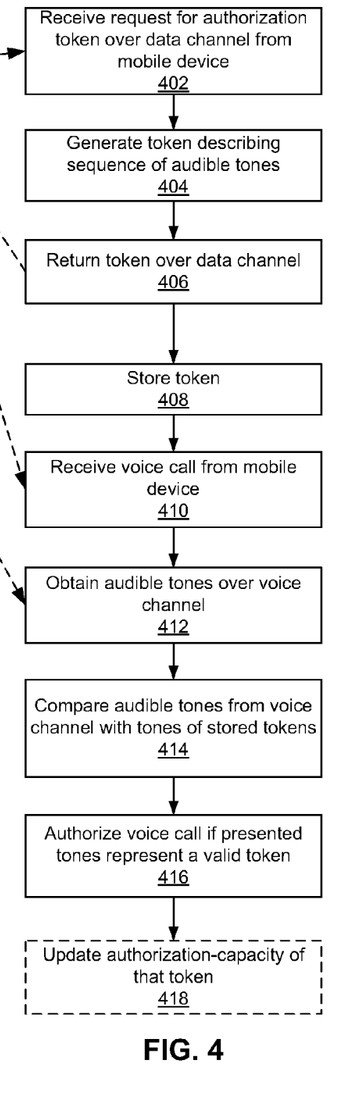
FIG. 4 depicts steps of a method that can be implemented by components authorizing the mobile device to access voice resources.

FIG. 4 depicts a counterpart method of providing and verifying authentication tokens, and responsively providing voice services (where arrows represent communications sent/received between devices performing the method of FIG. 4 and the method of FIG. 3). The depicted method includes receiving (402) a request for an authentication token over a data channel, and responsively generating (404) data describing a series of audible tones that will comprise the token. The token (data descriptive of the token) is returned (406) over the data channel. The data descriptive of the token can include data describing a series of frequencies, numbers of letters that are mappable to audible frequencies, DTMF tones, or the like. Data descriptive of the token is stored (408), to be used to verify token data presented over a voice channel (e.g., channel 103). The data descriptive of the token which is stored can vary from what is provided over the data channel to mobile device 107, so long as it can be used in a comparison to authenticate token data presented on the voice channel.

A voice call can be received (410) from a mobile device. This mobile device can be mobile device 107, but an identity of the calling mobile device is not known a priori. Rather, by usage of the disclosed authentication token sharing and presentation aspects disclosed herein, further confidence in an identity of the mobile device can be obtained. Audible tones are obtained (412) from the voice channel (hosting the voice call), and typically are converted into digital data representative of alphanumeric characters that can be compared with token information stored in token storage 124. The tones also can be recorded for later verification, logging purposes, and the like.

The tones obtained are compared (414) with tones for stored tokens (in typical examples, it is contemplated that a number of tokens can be active at any given time, and thus, a store of data describing such active tokens is maintained—e.g., token storage 124). Data for the received token may be compared with portions of a number of other tokens to determine whether the received tones are descriptive of a valid token. A variety of search strategies and organizations of a database of tokens (which can be stored in token storage 124) can be provided for such searching, in order to validate presented tokens.

If the token is valid, then the voice call (or other voice services) can be authorized (416). The database of tokens can be maintained (418), such as by invalidating the token in the database, so that it cannot be reused. Or, if the token used for successful verification is not to be used as a one-time token, then a number of remaining accesses can be decremented as applicable, for example.

The above description provides an overview of a system, signaling, and methods that can be implemented for voice services authentication by modulating audible tones determined by a token sent over a separate data channel. The following figures describe more particular details of example components that can be used in these examples.

Figure 5:
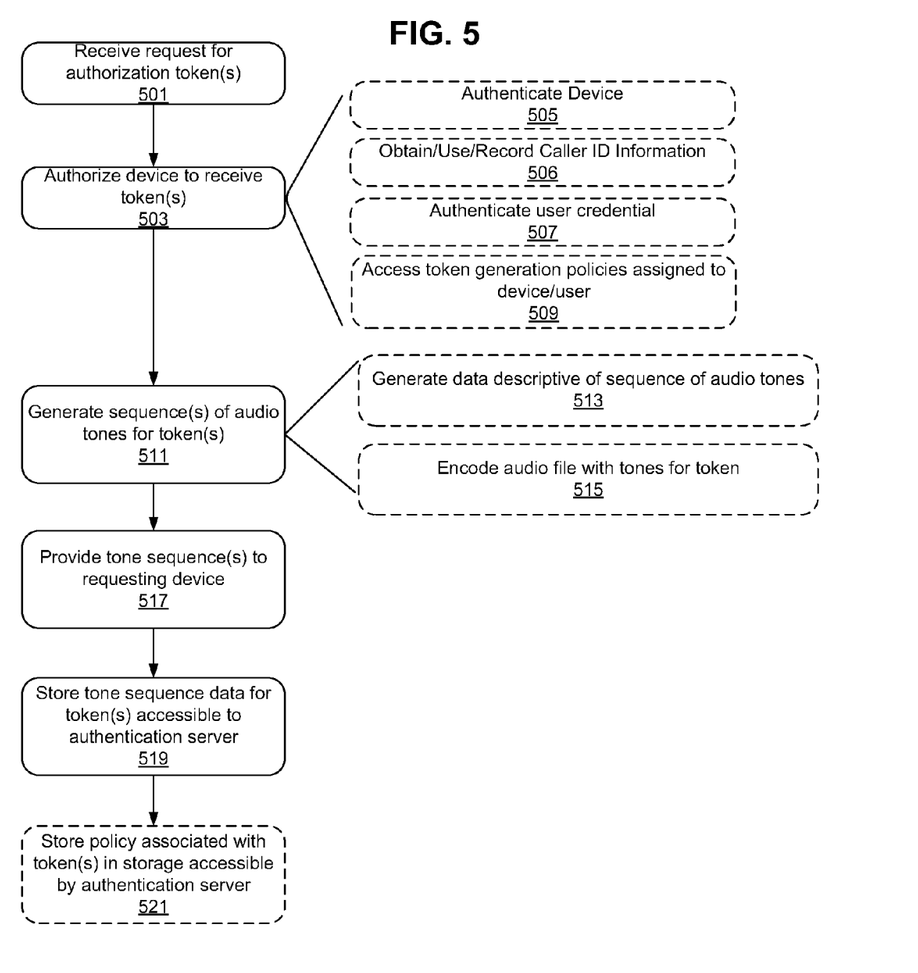
FIG. 5 depicts further details of an example method that can be used in generating tokens and authenticating them for authorizing access to voice resources.

FIG. 5 depicts a more detailed method involving issuance and verification of tokens that can be used for voice channel authentication. The method comprises receiving (501) a request for an authorization token over a data channel, and authorizing (503) the device to receive one or more authorization tokens that can be used to gain access to voice services over a voice channel. Authentication can include device-based authentication (505), where mobile device 107 can be authentication based on identifying information assigned to it, such as a code uniquely assigned to that device, or a certificate issued to device 107. Caller ID information also can be obtained (506) and used for authentication. The caller ID information also can be recorded and associated in token storage 124 with one or more tokens that were issued during the authentication.

A user of mobile device 107 also (or in substitution) can be authenticated (507). For example, a password, PIN, or other user credential can be used to authenticate a user. By further example, an algorithmically-generated code can be used to authenticate on the data channel (e.g., using an RSA dongle).

Once a user or device is identified and/or authenticated, token generation policies for that device, user, or combination of device and user can be accessed (509). Such accessed token generation policies can be used to determine whether a token should be issued. Such a determination can be based on a variety of conditions or parameters. For example, a token request can be accompanied by a request for a particular service, and the accessed policies can be used to determine whether that service is within authorization for the device or the user. Other aspects of such policies can include whether multiple tokens can be generated, if requested.

For a successful authorization (a path for unsuccessful authentication is not depicted), sequence(s) of audio tokens is determined (511). One approach for such generation is to generate (513) data descriptive of each sequence of audio tones. Another approach is to encode (515) an audio file with the sequence of tones to be used as the authentication token.

The tone sequence(s) (or the data descriptive of such each tone sequence) is provided (517) to the requested device. Data for the tone sequence is stored (519) in token storage 124. In some examples, policy data associated with the issued token also can be stored (521) in an association with the issued token. Data descriptive of the policy itself need not be provided to mobile device 107.

Such token generation policies can be associated with one or more of the device and the user. These policies can be used to determine what access should be granted based on a token issued to a particular device or user of a device, including voice services resource access. Such access can be specified as to which resources of a number of resources are to be accessible as well as how many times a given token can be used for authentication. Still further examples can be to allow a given token to provide accessibility to more sensitive resources for a single use and to less-sensitive resources for multiple times. Still other access policies can include an expiration time for the token. Of course, such policies can be used in a mixture, if desired. Still further, different policies can be applied to different devices and different users, and different combinations of users and devices.

Figure 6:
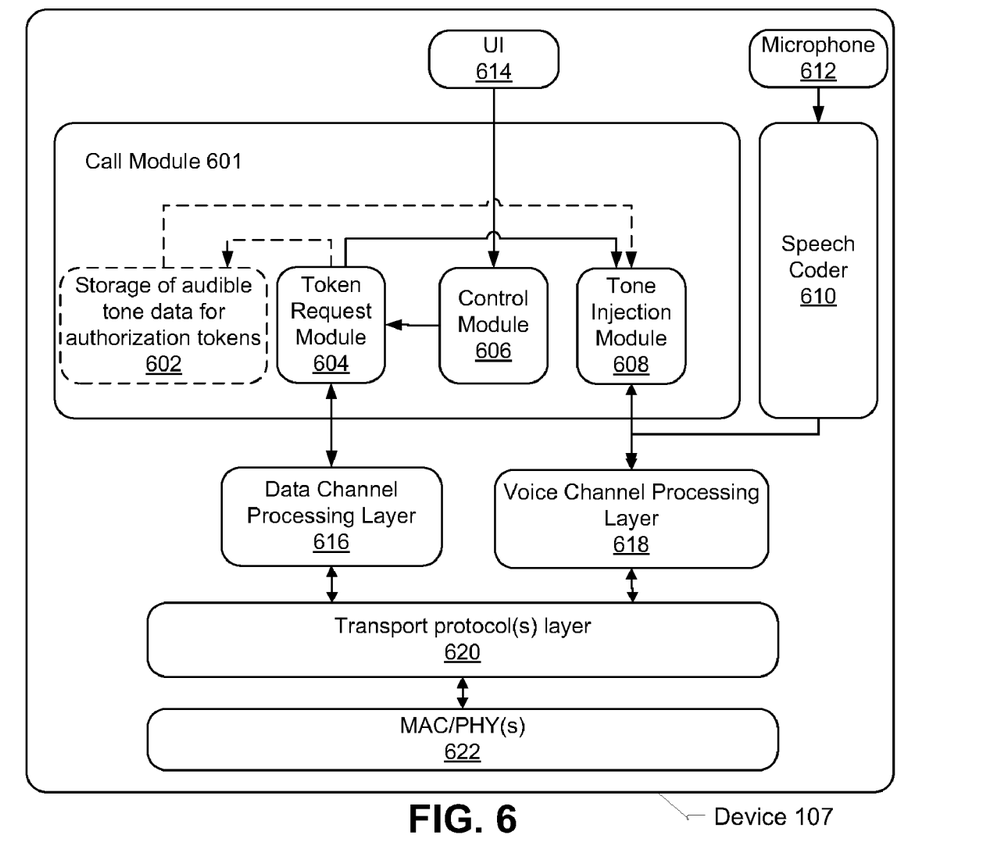
FIG. 6 depicts a functional module view of a mobile device that can request and use authentication tokens for voice resource access according to these examples.

FIG. 6 depicts an example functional module organization of mobile device 107. Call module 601 identifies a logical organization of modules which can be used for implementing aspects described herein. A token request module 604 interfaces with a data channel processing layer 616 to request tokens for use in voice channel authentication. Token request module 604 can operate responsively to input from a user interface 614, which is received by a control module 606. Data descriptive of authorization tokens that have been received can be stored in storage 602, and such data can be received from token request module 604.

The FIG. 6 example of device 107 also depicts a speech coder 610, which receives input from a microphone 612, and a tone injection module 608. Where there is token data storage, storage 602 can communicate with tone injection module 608. Token request module 604 also can communicate data for a received token directly to tone injection module 608 (can be temporarily buffered, the example relating to a sequence of call establishment, which desirably is transparent and prompt from a user perspective). Speech coder 610 and tone injection module 608 both can provide inputs to a voice channel processing layer 618.

Both data channel processing layer 616 and voice channel processing layer 618 can send and receive data to and from transport protocol(s) layer 620, which in turn communicates with MAC/PHY 622.

Figure 7:
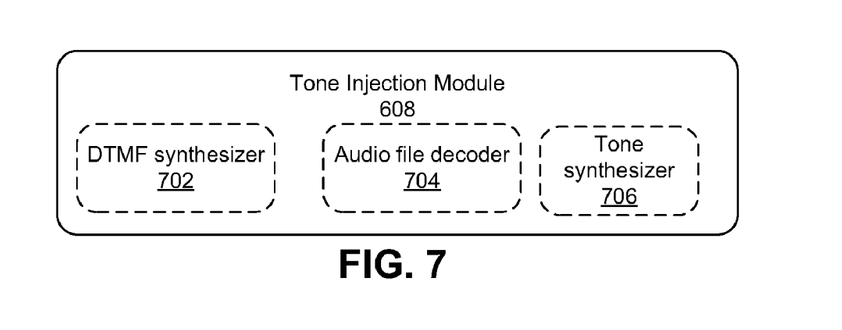
FIG. 7 depicts functional module aspects of a portion of the mobile device view of FIG. 6.

FIG. 7 depicts in more detail example components of tone injection module 608. A DTMF synthesizer 702 can be used for producing DTMF audible tones based on received authentication token data. For example, if the token comprises a series of numbers from 0-9 (or a subset thereof), or letters, or a combination thereof, then those numbers and letters can be mapped to DTMF tones normally associated with them in the PSTN and on standard PSTN devices. Such a DTMF synthesizer typically would be provided with a device capable of communicating on the PSTN, so that it can indicate to the switches what number is to be dialed.

In other implementations, a separate tone synthesizer 706 can be provided, which can receive generalized inputs for a token, which can be translated into audible tones according to a predetermined format. In still further examples, an audio file decoder 704 can be provided, which is used to play audible tones described by token data to be received by voice channel processing layer 618. Thus, the tone injection capability can be provided in a number of ways on mobile device 107.

Figure 8:
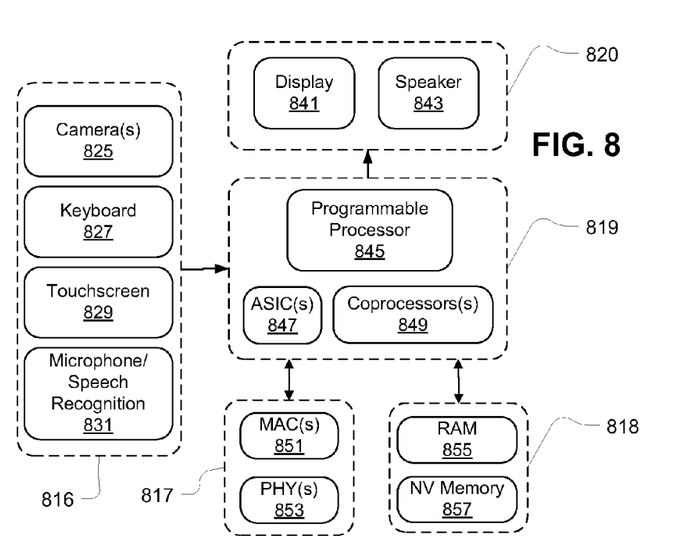
FIG. 8 depicts a physically oriented view of a mobile device that can function according to these examples.

The functional modules presented in FIGS. 6 and 7 can be implemented in a device having componentry according to the example of FIG. 8.

The device depicted may have a variety of components by which user input can be received, including a camera 825, a keyboard 827, a touch screen 829, and a microphone 831 that can be used for speech recognition, for example. These ways of receiving user input can be processed and ultimately couple with processing resource 819 that can be comprised of a plurality of components, such as a programmable processor 845, one or more ASICs 847, as well as other co-processors 849. For example, an ASIC or co-processor may be provided for implementing graphics functionality, encryption and decryption, audio filtering, and other such functions that often involve many repetitive, math-intensive steps. Processing resource 819 also may interface with one or more network interfaces 817, each of which may be comprised of one or more Media Access Controllers (MACs) 851, which in turn interface with physical layers 853.

Processing resource 819 also may interface with a memory resource 818 which may be comprised of a plurality of memories, including a RAM 855, and a non-volatile memory 857, which can be implemented with one or more of Flash memory, PROM, EPROM, and so on. Non-volatile memory 857 can be implemented as flash memory, ferromagnetic, phase-change memory, and other non-volatile memory technologies. Non-volatile memory 857 also can store programs, device state, various user information, one or more operating systems, device configuration data, and other data that may need to be accessed persistently. Processing resource 819 also may interface with user output 820 components, which can include a display 841, as well as a speaker 843, which can be used for text to speech or for performing audio, more generally.

Figure 9:
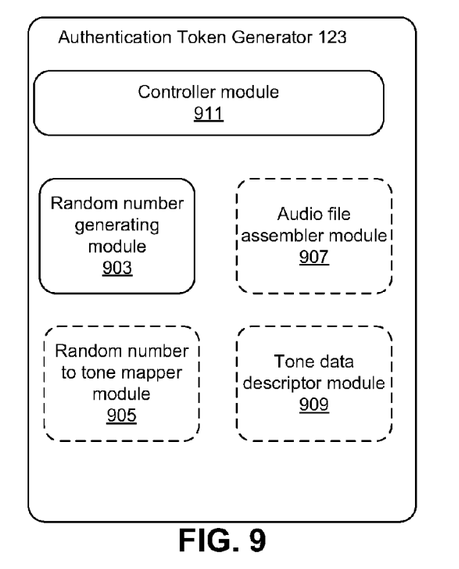
FIG. 9 depicts functional module components of an authentication token generator as described herein.

FIG. 9 depicts example functional modules that can be implemented for an authentication token generator 123 that can be used in example systems according to these disclosures, such as that of FIG. 1. Token generator 123 comprises a controller module 911 provided for controlling operation of other modules of token generator 123. Token generator 123 comprises random number generating module 903, which can be used for generating random numbers that can be used as authentication tokens for voice channel authentication (and more generally, random number generating module 903 may be configured to output random strings of alphanumeric characters, or random binary numbers). Token generator 123 may comprise an optional random number to tone mapper module 905, which can be used to determine which tones are mapped to which elements of random number generating module 903. Tone mapper module 905 would be provided if authentication tokens are to be sent to mobile devices as audio data, rather than as binary data that can be mapped by mobile devices to particular audible tones. In conjunction with tone mapper module 905, an audio file assembler module 907 can receive outputs of mapper module 905 indicating a series of tones to assemble into an audio file, which will be provided as the data descriptive of an authentication token to a requesting mobile device.

A tone data descriptor module 909 also can be provided, which can input tone information from tone mapper module 905 and determine a description of the tones that will be able to be used by the requesting mobile device. For example, in some cases, audible tones can be presented automatically by tone injection module 608 (i.e., without user involvement), sophisticated audio tone sequences can be used. For example, a tone sequence that specifies both a sequence of tones, and a duration for each tone can be provided. By contrast, if a person were to be reading a number indicative of a code and entering the number on a keypad, it would be difficult to enforce a variable tone duration requirement. Thus, tone description module produces data that describes the particular sequence of tones that the mobile device is to provide over the voice channel in order to authenticate. Such a description can follow a pre-arranged or negotiated format, and where the format is negotiated, information indicative of a particular negotiated format can be stored with data describing the authentication token in token storage 124.

Figure 10:
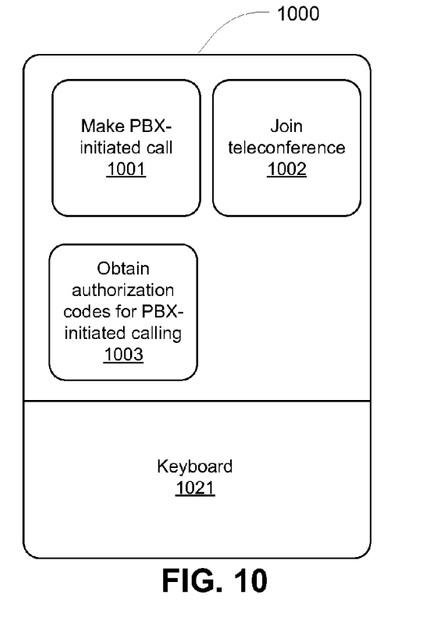
FIG. 10 depicts aspects of a user interface that can be provided on a mobile device for these examples.

FIG. 10 depicts a simplified view of an example user interface 1000 that can be provided for allowing a user to control usage of some aspects described herein. FIG. 10 depicts that user interface 1000 can provide a button (virtual or physical) to allow a user to accept an input indicating a desire to make a PBX-initiated call (e.g., a call from mobile device 107 to PBX 118, and outbound from PBX 118 to a called party). Another depicted option is to allow a user to specify joining of a teleconference, which can responsively engage the methods described above to obtain and use, or use a previously received token over a voice channel that will be established. FIG. 10 also depicts that user interface 1000 can provide an input capability to obtain a plurality of authentication tokens 1003, which can be stored on the device. A plurality of such tokens can be obtained, for example, if the user expects to be outside of data network coverage for a period of time, but nevertheless desires to be able to use voice channel features that are secured by the authentication procedures described above. Such UI aspects also can be implemented by presenting a menu of options from which a selection can be made by providing input through a keyboard 1021, or from other available user input capabilities, such as those depicted in FIG. 8.

As can be discerned from the above description, authentication tokens can be obtained by a mobile device, over a more-secure data channel, for one time use in calling an end point over a less-secure voice channel and authenticating to establish a right to use voice services. The token issuer can communicate with the end point, or with another functional module that validates token information provided over the voice channel by comparing such provided token information with token information previously issued over the data channel (obtained by the mobile device, and issued by a token issuer). The one time token can be invalidated, such that the mobile device requests another token over the data channel for another authentication. The mobile device can be configured to automatically obtain the authentication token over the data channel, call the appropriate end point on the voice channel and module audible tones for the token over the voice channel, without involving a user of the device. Thus, preferably, the above token-related authentication techniques are implemented to be transparent to a user.

Aspects described above can be implemented as computer executable code modules that can be stored on computer readable media, read by one or more processors, and executed thereon.

In addition, separate boxes or illustrated separation of functional elements of illustrated systems does not necessarily require physical separation of such functions, as communications between such elements can occur by way of messaging, function calls, shared memory space, and so on, without any such physical separation.

For example, some functions were attributed to the PBX depicted and described, while other functions were attributed to authentication module, and other functions to an authentication token generator. However, such functions need not be implemented in physically or logically separated platforms.

More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

We claim:

1. A method for implementation on a mobile device, comprising:
   requesting data descriptive of an authentication token, over a data channel between the mobile device and a server;
   receiving, at the mobile device, the requested data descriptive of the authentication token; and
   responsive to receiving the data descriptive of the requested authentication token, determining, at the mobile device, a series of audible tones from the data describing the authentication token,
   initiating a voice channel call from the mobile device to a called entity, and
   modulating the determined series of audible tones over the voice channel for gaining authorization to use voice services providable over the voice channel.

2. The method of claim 1, wherein the determining of the series of audible tones comprises determining a series of Dual-Tone MultiFrequency (DTMF) tones using a predetermined mapping between alphanumeric characters encoded by the data descriptive of the authentication token to DTMF tones.

3. The method of claim 1, wherein the modulating comprises synthesizing the determined series of audible tones and providing the synthesized tones to an input to the voice channel.

4. The method of claim 1, wherein the response to receiving the data descriptive of the authentication token further comprises storing the received data and subsequently performing the determining, initiating, and modulating.

5. The method of claim 1, wherein the called party comprises a Private Branch eXchange (PBX), and the mobile device uses the authentication token to authenticate for usage of services provided by the PBX.

6. The method of claim 1, wherein the requesting data descriptive of an authentication token comprises requesting data descriptive of a plurality of authentication tokens, and the response to receiving the data descriptive of the requested authentication tokens further comprises storing the data descriptive of the plurality of authentication tokens.

7. The method of claim 6, further comprising removing each of the authentication tokens from storage after performing the determining, initiating, and modulating for that authentication token.

8. A mobile device, comprising:
   a network interface for communicating over a voice communication channel;
   a network interface for communicating over a packet data channel;
   one or more processing modules to
      request from a server, over the data channel, an authorization token, responsive to a call initiation input;
      receive, over the data channel, data representative of the authorization token;
      responsively to receiving the data representative of the authorization token, initiate a connection, over the voice-grade communication channel with a remote entity; and
      present the authorization token as a series of audible tones over the voice-grade communication channel for authorizing the device to access one or more voice-call related resources available over the voice-grade communication channel.

9. The mobile device of claim 8, further comprising a data storage resource for storing a plurality of authentication tokens received, and wherein the one or more processing modules are further to present each of the plurality of authentications only once for authorizing the device.

10. The mobile device of claim 8, wherein the network interface for communicating over a voice-grade communication channel and the network interface for communicating over a data channel comprise a broadband wireless radio interface.

11. The mobile device of claim 8, wherein the network interface network interface for communicating over a data channel comprises a local wireless network interface.

12. A non-transitory computer readable medium storing computer executable instructions and data for implementing a method,
   the data comprising:
      a network address of an authentication token generator; and
      a telephone number for an entity capable of receiving voice calls, the entity associated with the authentication token generator;

the method of the computer executable instructions comprising:
  using a data protocol, contacting the authentication token generator identified by the network address to obtain an authentication token therefrom; and
  responsively and automatically upon obtaining the authentication token,
    dialing the telephone number for the entity on a voice channel,
    interpreting the obtained authentication token as a series of audible tones, and
    modulating series of audible tones on the voice channel to authenticate for access over the voice channel.

13. The non-transitory computer readable medium of claim 12, wherein the instructions further comprise instructions for requesting a plurality of authentication tokens, storing the plurality of authentication tokens, using each of the authentication tokens only once for authentication for access to the entity.

14. The non-transitory computer readable medium of claim 12, wherein the entity comprises a Private Branch eXchange (PBX) coupled for providing data determined from the series of audible tones for comparison with data descriptive of tokens previously issued by the authentication token generator.

15. A system, comprising:
  a call receiver module configured for receiving incoming voice calls from a voice communication channel, and for detecting a plurality of audible tones provided over the voice communication channel that are representative of a presented authentication token;
  a server coupled to a wide area data network separate from the voice communication channel, and comprising a module for receiving requests for authentication tokens over the data network from mobile devices, and for outputting, to respective mobile devices, over the data network, authorization tokens responsive to received requests;
  a storage module coupled with the server for receiving and storing data for the outputted authentication tokens; and
  an authorization module coupled with the storage module and with the call receiver module, the authorization module configured for determining, based on authentication tokens in the storage module, whether the presented authentication token is valid, and responsive to validation, indicating to the call receiver module that the communication is permissible.

16. The system of claim 15, wherein the call receiver module is comprised in a Private Branch eXchange (PBX).

17. The system of claim 15, wherein the authorization module further is configured for accessing policy information from the storage module, and using the accessed policy information in determining whether the presented authorization token is valid.

18. The system of claim 15, wherein the authorization module further is configured for accessing policy information from the storage module, and using the accessed policy information in determining whether a service available from the PBX, that is requested during the communication is to be made accessible.

19. The system of claim 15, wherein the authorization module further is configured for invalidating the presented token after a single validation of the presented token.

20. The system of claim 15, wherein the wide area data network comprises broadband wireless and local area network wireless interfaced with a wide area data network.

21. The system of claim 15, wherein the server stores caller ID information for a mobile device that requests and receives an authentication token, associated with data for the authentication token in the storage module.

22. The system of claim 15, wherein the caller ID information is used with the detected audio tokens for validation.

23. The system of claim 15, wherein data for each outputted authentication code stored in the storage module also comprises an expiration time.

24. The system of claim 23, wherein the expiration time is less than 30 seconds.

25. The system of claim 15, wherein the server generates a plurality of authentication tokens and sends them to a requesting mobile device upon authorization and the authorization module invalidates each authentication code of the plurality after a single presentation of it for validation.

26. The system of claim 15, wherein the server further generates validity criteria stored with authorization tokens in the storage module; and the authorization module uses the validity criteria in determining whether the presented authentication token is valid.

27. The system of claim 15, wherein the authorization module is implemented in one of the authorization module, and a PBX comprising the call receiver module.

28. A method for implementation on a mobile device, comprising:
  receiving, at the mobile device, data descriptive of an authentication token over a data channel;
  responsive to receiving the data descriptive of the requested authentication token, performing, at the mobile device, at least one set of actions, selected from the sets of actions comprising
    (1) storing, at the mobile device, the received data descriptive of the authentication token, and upon receiving a request to begin an authenticated voice call, retrieving the stored data, determining a series of audible tones from the retrieved data, and
    (2) automatically determining, at the mobile device, a series of audible tones from the data describing the authentication token;
  initiating a voice channel call from the mobile device to a called entity; and
  modulating the series of audible tones determined from the data descriptive of the authentication token over the voice channel for gaining authorization to use voice services providable over the voice channel.

29. The method of claim 28, wherein the series of audible tones comprises a series of Dual-Tone MultiFrequency (DTMF) tones selected based on a predetermined mapping between alphanumeric characters encoded by the data descriptive of the authentication token to DTMF tones.

30. The method of claim 28, wherein the called entity comprises a Private Branch eXchange (PBX), and the mobile device uses the authentication token to authenticate for usage of services provided by the PBX.

* * * * *